United States Patent Office 2,941,148
Patented June 14, 1960

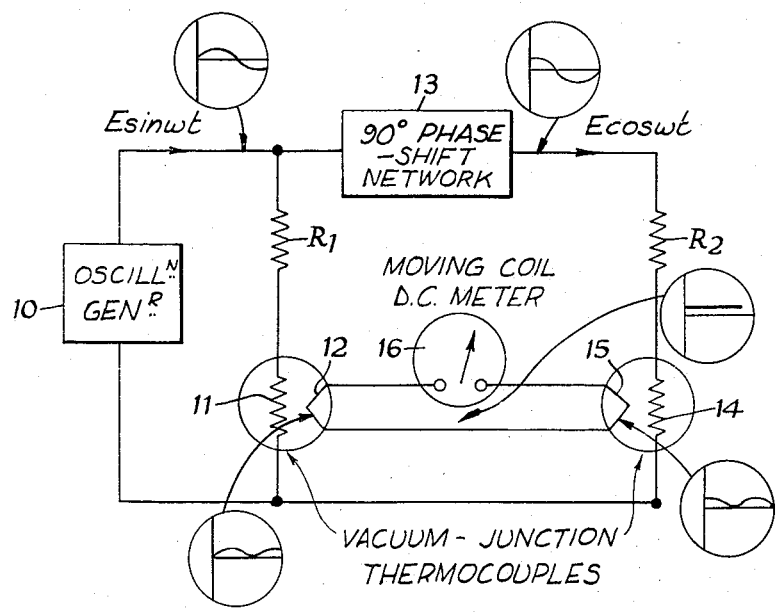

2,941,148

LOW FREQUENCY OSCILLATORS AND TO THE MEASURING OF THE AMPLITUDE OF LOW FREQUENCY OSCILLATIONS

Reginald Catherall, Ashford, England, assignor to The Solartron Electric Group Limited, Thames Ditton, Surrey, England Original application May 26, 1955, Ser. No. 511,313, now Patent No. 2,831,975, dated Apr. 22, 1958. Divided and this application Nov. 26, 1956, Ser. No. 624,400

3 Claims. (Cl. 324—106)

This invention relates to the measurement of the amplitude of low frequency oscillations and is divided out of my application, Serial No. 511,313, filed May 26, 1955.

This earlier application is concerned with oscillation generators capable of generating oscillations of very low frequency for instance below 10 c.p.s. and generators whose output frequency may be variable over a range including very low frequencies, for instance a range extending from above audio frequency down to 0.1 c.p.s. or even 0.01 c.p.s. or less.

For use with such very low frequencies there is a need for means capable of measuring their amplitude. Heavily damped meters have been employed for frequencies down to approximately .5 c.p.s., but such devices are, of course, quite unsuitable for frequencies of, say, .01 c.p.s., in view of the extremely lengthy response period involved. The cathode ray oscillograph has, up-to-date, been the most satisfactory answer to this problem, but is quite an involved piece of equipment.

The present invention has for its principal object to provide measuring means capable of indicating voltages of very low frequency with the aid of a normal meter, such as a normal moving coil D.C. meter.

According to the present invention apparatus for measuring the amplitude of an oscillation comprise a phase-shifting means effecting a phase shift of 90°, means for applying said oscillation to the input of said phase-shifting means, two devices each having input and output terminals and generating at said output terminals voltages substantially proportional to the square of the voltages applied to said input terminals, means for applying said oscillation directly to the input terminals of one of said devices, means coupling the input terminals of the other of said devices to the output of said phase-shifting means, indicating means, and means coupling the output terminals of said devices to said indicating means in additive sense, whereby the indicating means indicates the sum of the voltages at the output terminals of said devices.

The invention will be described by way of example with reference to the accompanying drawing which is a circuit diagram of one embodiment thereof.

In the drawing a voltage $E \sin \omega t$ to be measured is generated in an oscillation generator 10 and is applied through a resistor $R_1$ to the heater 11 of a vacuum junction thermocouple 12. The voltage $E \sin \omega t$ is also applied through a phase shift network 13 producing a phase shift of 90°, and hence an output $E \cos \omega t$, and through a resistor $R_2$ to the heater 14 of a second vacuum junction thermocouple 15. The output of the thermocouples 12 and 15 are applied in series—adding relation to a moving coil, direct current meter 16.

The moving coil meter 16 will, to a first order, give an indication of E independent of the frequency and of the point in time of the cycle.

Thus assuming the thermocouple E.M.F.'s to be exactly proportional to the square of the heater current, then at frequencies so low that the temperature of each heater follows the instantaneous value of the applied current, E.M.F.'s are obtained from the thermocouples 12 and 15 proportionate to $E^2 \sin^2 \omega t$ and $E^2 \cos^2 \omega t$. The instantaneous voltage applied to the moving coil meter 16 will thus be proportionate to $E^2 (\sin^2 \omega t + \cos^2 \omega t)$ and hence to $E^2$. At frequencies so high that the temperature of each heater is constant over a cycle of applied current, the E.M.F.'s are proportional to $$\frac{E^2}{2\pi}\int_0^{2\pi} \sin^2 \omega t \cdot d\omega t \text{ and } \frac{E^2}{2\pi}\int_0^{2\pi} \cos^2 \omega t \cdot d\omega t$$

and thus their sum is proportional to $\frac{1}{2}E^2 + \frac{1}{2}E^2$ and hence to $E^2$ with the same constant of proportionality as before.

At intermediate frequencies, such that the temperature varies somewhat over a cycle, the meter indication will remain constant insofar as the thermal constants of both thermocouples are identical.

With mached pairs of thermocouples commercially obtainable, the meter indication is found to be substantially steady and independent of frequency over a wide range.

It will be readily apparent that the meter 16 used can be directly calibrated in terms of R.M.S. voltage.

The oscillations $E \sin \omega t$ and $E \cos \omega t$ may be obtained over a wide range of low frequencies from a circuit such as is disclosed in application Serial No. 511,313. When the network 13 is a passive network the circuit illustrated herein is suitable either for measuring the amplitude of an oscillation of fixed frequency or, when the components of the network 13 are made variable, the circuit can be used for measuring the amplitude over a range of frequencies by proper adjustment of the variables.

Any measuring means which measure the sum of the squares of the amplitude of two equal sine waves at 90° phase difference are within the principle of the invention, but the use of thermocouples in series is preferred as giving a simple and convenient method of measuring the amplitude.

The new amplitude measuring means described above is particularly useful in connection with oscillations of a very low frequency such as can be produced by the improved low frequency oscillators of application Serial No. 511,313 hereinbefore referred to. It will be readily apparent that in the case of oscillations which require 100 seconds or more to complete their cycle, conventional methods of measuring the amplitude of such oscillations would require at the very least a like period of time to effect measurement, and even the very expensive cathode ray oscillograph equipment would require at least half this period. With the new amplitude measuring means described herein however, it is possible to measure the amplitude of oscillations requiring any period of time in which to complete their cycle, within a time independent of the period of such oscillations and dependent only on the time constant of the measuring means adopted, which in the case of the preferred form using suitable thermocouples is of the order of 1 or 2 seconds.

I claim:

1. Apparatus for measuring the amplitude of an oscillation comprising phase-shifting means effecting a phase-shift of 90°, means for applying the said oscillation to the input of said phase-shifting means, two devices each having input and output terminals and generating at said output terminals direct current voltages substantially proportional to the square of the voltages applied to said input terminals, means for applying said oscillation directly to the input terminals of one of the said devices, means coupling the input terminals of the other of said devices to the output of said phase-shifting means, direct-current responsive indicating means, and means coupling the output terminals of said devices to said indicating means in additive sense, whereby the indicating means indicates the sum of the voltages at the output terminals of said devices.

2. Apparatus according to claim 1, wherein said devices are vacuum junction thermocouples, said input terminals being connected to heaters for said thermocouples respectively.

3. Apparatus according to claim 1, wherein said indicating means is a D.C. indicating meter.

References Cited in the file of this patent

UNITED STATES PATENTS

| | | |
|---|---|---|
| 2,022,790 | Sturdy | Dec. 3, 1935 |
| 2,059,594 | Massa | Nov. 3, 1936 |
| 2,644,923 | Gregg | July 7, 1953 |
| 2,762,008 | Gordon | Sept. 4, 1956 |

UNITED STATES PATENT OFFICE

CERTIFICATE OF CORRECTION

Patent No. 2,941,148                  June 14, 1960

Reginald Catherall

It is hereby certified that error appears in the above numbered patent requiring correction and that the said Letters Patent should read as corrected below.

In the grant, lines 2 and 12, aad in the heading to the printed specification, lines 5 and 6, name of assignee, for "The Solartron Electric Group Limited", each occurrence, read -- The Solartron Electronic Group Limited --.

Signed and sealed this 20th day of December 1960.

(SEAL)
Attest:

KARL H. AXLINE                           ROBERT C. WATSON

Attesting Officer                       Commissioner of Patents